(No Model.)

J. H. MALONEY.
NUT LOCK.

No. 564,289. Patented July 21, 1896.

WITNESSES:

INVENTOR
James H. Maloney.
BY
ATTORNEYS.

UNITED STATES PATENT OFFICE.

JAMES H. MALONEY, OF NEW YORK, N. Y.

NUT-LOCK.

SPECIFICATION forming part of Letters Patent No. 564,289, dated July 21, 1896.

Application filed December 21, 1895. Serial No. 572,947. (No model.)

*To all whom it may concern:*

Be it known that I, JAMES H. MALONEY, a citizen of the United States, and a resident of New York, in the county of New York and State of New York, have invented certain new and useful Improvements in Nut-Locks, of which the following is a specification, reference being had to the accompanying drawings, forming a part thereof, in which similar letters of reference indicate corresponding parts.

This invention relates to nut-locks, and the object thereof is to provide an improved device of this class which is simple in construction, effective in operation, and comparatively inexpensive; and with this and other objects in view, the invention consists in the construction, combination, and arrangement of parts, hereinafter described and claimed.

The invention is fully disclosed in the following specification, of which the accompanying drawings form a part, in which—

Figure 1:
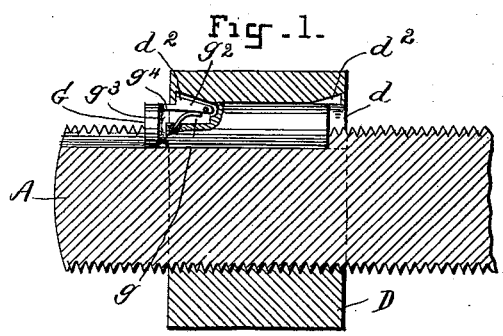
Figure 2:
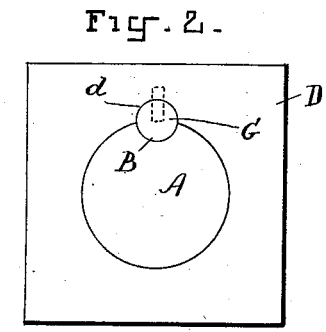
Figure 3:
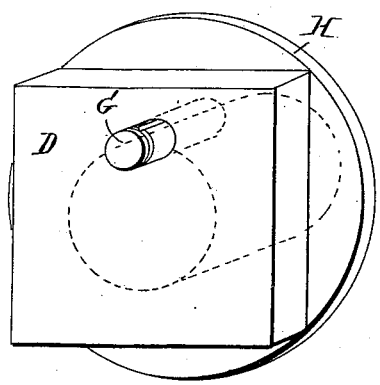
Figure 4:
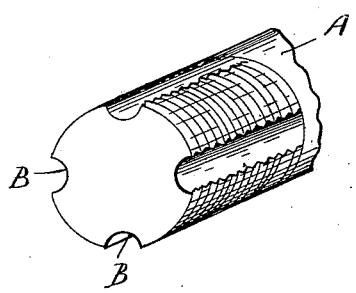

Figure 1 is a longitudinal section of the screw-threaded end of a bolt, showing also a nut mounted thereon and my improved nut-lock connected therewith; Fig. 2, an end view thereof; Fig. 3, a perspective end view showing a modified form of construction, and Fig. 4, a perspective end view of the screw-threaded bolt.

In the practice of my invention I provide a rod or bolt A, the end of which is screw-threaded in the usual manner, and formed longitudinally in said screw-threaded portion are longitudinal grooves or recesses B, which are segmental in cross-section, and I also provide a nut D having a screw-threaded central bore, in one side of which is formed a groove $d$, which is also segmental in cross-section, and formed near each end of said groove is a triangular notch or recess $d^2$. In connection with the rod or bolt and the nut thus formed I provide a key-bolt G, near one end of which is formed a longitudinal cavity $g$, in which is placed a spring-operated pawl $g^2$, which is adapted to operate in connection with the notch or recess $d^2$, and the end of the bolt G is also provided with an annular groove or recess $g^3$.

The operation of this form of construction will be readily understood from the foregoing description when taken in connection with the accompanying drawings.

When the nut has been screwed into proper position on the rod or bolt A, the segmental groove $b$ therein is caused to register with one of the corresponding grooves B in the rod or bolt, and the key-bolt G is then inserted into said groove, and when inserted into proper position the spring-operated pawl $g^2$ will be projected into the notch or recess $d^2$ adjacent to the outer end of the bolt, and said key-bolt will be securely held in place thereby and the nut D will be securely locked to the rod or bolt A.

The pawl $g^2$ is provided with a projection $g^4$, by which the outer end thereof may be depressed when it is desired to remove the key-bolt, and the object of forming one of the notches or recesses $d^2$ at each side of the nut is to provide means for locking said nut in position from either side.

In the construction shown in Fig. 3 the nut D is provided with a washer H, and the rod or bolt A is provided with but one of the grooves B.

My invention is not limited to the number of the grooves formed in the rod or bolt, or to the form thereof in cross-section, nor to the form of the groove $d$ in the nut D, the only object in this connection being to so form the key-bolt that it corresponds in cross-section to the form of these grooves, and I therefore reserve the right to make all such changes in and modifications of the construction herein described as fairly come within the scope of the invention.

Having fully described my invention, I claim as new and desire to secure by Letters Patent—

As an improved article of manufacture, a nut-lock, consisting of a screw-threaded bolt A, having a longitudinal groove or grooves B, nut D, having an internal groove $d$, provided with terminal notches $d^2$, and key-bolt G, having a longitudinal cavity $g$, containing a spring-operated pawl $g^2$, said key-bolt and nut being relatively reversible.

In testimony that I claim the foregoing as my invention I have signed my name, in presence of the subscribing witnesses, this 17th day of December, 1895.

JAMES H. MALONEY.

Witnesses:
C. GERST,
S. L. HAWKSHURST.